United States Patent [19]

Haldipur et al.

[11] Patent Number: 5,185,019
[45] Date of Patent: Feb. 9, 1993

[54] FILTERING APPARATUS

[75] Inventors: Gaurang B. Haldipur, Monroeville; William J. Dilmore, Murrysville, both of Pa.

[73] Assignee: Westinghouse Electric Corp., Pittsburgh, Pa.

[21] Appl. No.: 865,545

[22] Filed: Apr. 9, 1992

Related U.S. Application Data

[62] Division of Ser. No. 600,953, Oct. 22, 1990, Pat. No. 5,143,530.

[51] Int. Cl.[5] .............................................. B01D 46/00
[52] U.S. Cl. ...................................................... 55/378
[58] Field of Search .................................. 55/378, 341.1

[56] References Cited

U.S. PATENT DOCUMENTS

| 4,284,419 | 8/1981 | Remillieux | 55/96 |
|---|---|---|---|
| 4,292,053 | 9/1981 | Remillieux | 55/96 |
| 4,525,184 | 6/1985 | Tassicker | 55/302 |
| 4,553,989 | 11/1985 | Chaudot | 55/177 |
| 4,604,112 | 8/1986 | Ciliberti et al. | 55/117 |
| 4,615,283 | 10/1986 | Ciliberti et al. | 110/215 |
| 4,680,038 | 7/1987 | Titus | 55/302 |
| 4,735,635 | 4/1988 | Israelson et al. | 55/71 |
| 4,764,190 | 8/1988 | Israelson et al. | 55/269 |
| 4,885,014 | 12/1989 | Bissingen et al. | 55/484 |
| 4,904,287 | 2/1990 | Lippert et al. | 55/302 |
| 4,969,937 | 11/1990 | Tassicker | 55/302 |

FOREIGN PATENT DOCUMENTS

| 0402032 | 12/1990 | European Pat. Off. . |
|---|---|---|
| 867780 | 2/1954 | Fed. Rep. of Germany . |
| 1407941 | 1/1972 | Fed. Rep. of Germany . |
| 2044123 | 10/1980 | United Kingdom . |

Primary Examiner—Bernard Nozick

[57] ABSTRACT

A filter tube assembly for a ceramic filter tube consisting of an annular elongated section from which a head extends. The head has a section whose outer surface is in the shape of a segment of a sphere which tapers out from the elongated section and merges into a cylindrical section. The assembly includes a stainless steel housing internally shaped to accommodate the head. Gaskets are interposed between the housing and the head which are structured cooperatively with the head to preclude dislodgement of the tube from the housing, to take up effectively the differential in thermal expansion between the tube and the housing, to prevent eccentric loading of the tube, to prevent the penetration of particulate into the housing and to seal asperities in teh surface of the tube.

5 Claims, 1 Drawing Sheet

FILTERING APPARATUS

CROSS REFERENCE TO RELATED APPLICATION

This application is a division of application Ser. No. 07/600,953 filed Oct. 22, 1990, U.S. Pat. No. 5,143,530 to Gaurang B. Haldipur and William J. Dilmore for FILTERING APPARATUS.

BACKGROUND OF THE INVENTION

This invention of the parent application relates to filtering apparatus for separating solid or liquid (aerosols) particulate from carrier fluids such as the flue or fuel gas streams derived from combustion or gasification and other like processes. The invention of the parent application concerns itself with filtering apparatus in power plants and other facilities such as industrial and municipal incinerators in which the separation of particulate is effected by ceramic so-called "candle filters." The so-called "candle filters" are hollow ceramic porous filter tubes and will be sometimes referred to in this application as filter tubes. "Candle filters" are currently available from such organizations as Schumacher of Crailsheim, West Germany, Didier, Eisenberg, West Germany, Refracton, Rochester, N.Y. and Coors, Golden, CO., U.S.A. A typical candle filter is 2.36-inches (60 mm) in outside diameter and 1.57-inches (40 mm) inside diameter below and the head and up to 4.92-feet (1.5 meters) in length. The gas to be cleaned flows across the outside of the filter and the cleaned gas flows through the inside of the filter. The bottom of the "candle filter" is sealed.

It is essential that each filter tube is mounted so that it performs effectively its filtering function in the gas being processed, which is at a high temperature and under high pressure. Typically, the mounting includes a metal housing in which each filter tube is suspended in filtering relationship with the gas which is processed. It is necessary that the differential thermal expansion between the metal housing and the ceramic tube, which occurs at the high temperature of the gas being processed, be taken up. It is also necessary that the penetration of the separated particulate between the filter tube and the housing be suppressed. The filter tube must be securely mounted and centered in the housing so that it does not become disengaged from the housing under the pressure of the gas. Displacement of the tube during operation and eccentric loading of the tube must be avoided. Asperities in the ceramic tube in regions where it interfaces with the housing must be filled to the extent practicable.

It is an object of this invention to provide a filter assembly which meets the above-listed requirements.

SUMMARY OF THE INVENTION

In accordance with this invention, there is provided a filter tube assembly which meets this object. The assembly includes a housing for the head of each filter tube. Gaskets are interposed between the housing and the head and compressed by the housing. The head and the gaskets are so structured and secured that the filter tube does not become dislodged from the housing. One gasket serves as a trap for the particulate and, also, to prevent displacement of the filter tube. Another gasket serves to take up the differential expansion between the metal housing and the ceramic filter tube and to fill asperities in the surface of the head. A third gasket is compressed by a nut through a washer and serves to suppress eccentric loading of the filter tube and to fill up asperities in the top of the head. The housing has a top which carries a tube that is secured to the auxiliary tube sheet of the filtering apparatus in which the ceramic tube assemblies in accordance with this invention are mounted.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF EMBODIMENT

Figure 1:
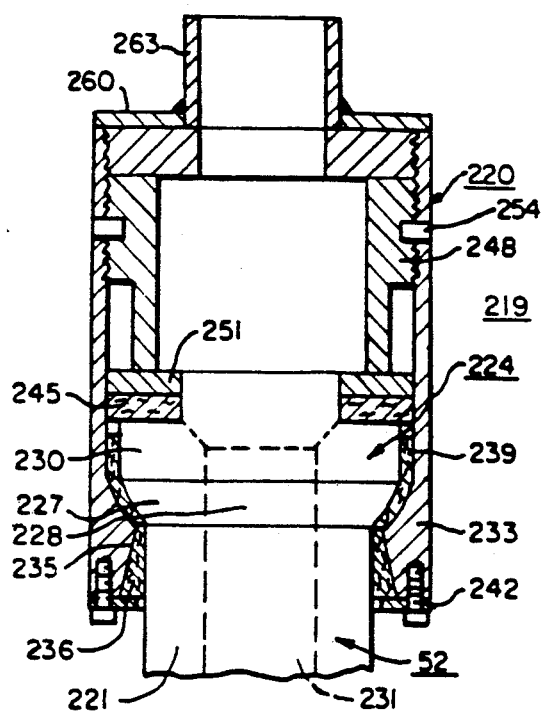
FIG. 1 is a view partly in longitudinal section and partly in side elevation of a filter tube assembly in accordance with this invention.

The filter tube assembly 219 in accordance with this invention includes a filter tube 52, a mounting 220 for the filter tube. Each filter tube 52 is an elongated annular member 221 closed at the bottom and extending from an annular head 224. The head 224 includes a section 227 extending from the elongated member 221, whose external surface is a segment of a sphere. This section merges into a section 230 having a circularly cylindrical external surface. The holes 231 and 228 in the elongated member 221 and head 224, respectively, are coextensive expanding into a frustro-conical contour in the upper part of section 230. The filter tubes 52 are composed of ceramic material.

Figure 2:
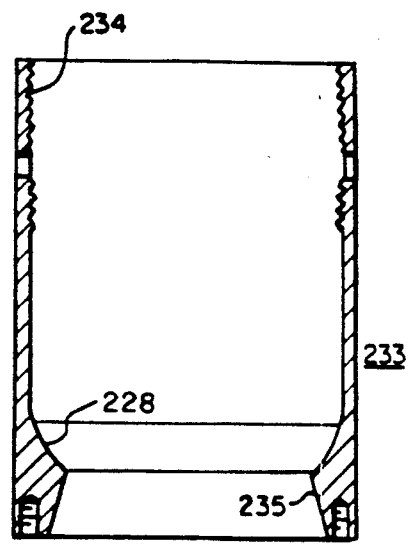
FIG. 2 is a view in longitudinal section of the housing for the head of the filter tube which forms part of the support of the filter tube of this assembly.
Figure 3:
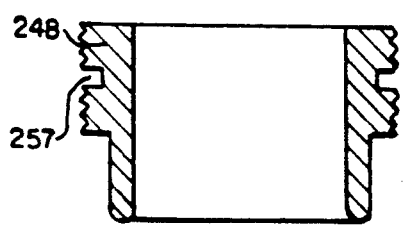
FIG. 3 is a view in longitudinal section of the nut for applying axial pressure to the annular gasket of the filter tube support.
Figure 4:
FIG. 4 is a view in transverse section of the annular member through which pressure is applied by the nut shown in FIG. 3.
Figure 5:
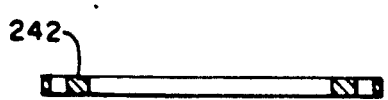
FIG. 5 is a view in transverse section of the bottom ring of the housing for the head of the filter tube.
Figure 6:
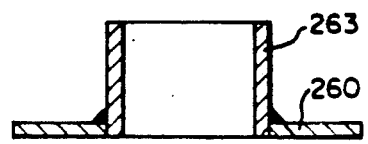
FIG. 6 is a view in longitudinal section of the top of the support for the filter tube.

The mounting means 220 includes a housing 233 (FIG. 2) for the head 224 having an external circularly cylindrical surface. The internal surface of the housing 233 is circularly cylindrical except, in its lower part 233 (with reference to FIG. 2), where there is a section 232 matching the external spherical contour of the head and terminating in a short frustro-conical section 235. The internal surface of the housing carries a thread 234 at the top. The housing is typically composed of 310 stainless steel. The housing 233 is mounted on the head with its upper part (with reference to FIG. 1) extending above the head and with gaskets 236 and 239 interposed between the head and its lower part. The outer surface of the gasket 236 is frustro-conical to match the inner surface 235 at the lower end of the housing. The gaskets 236 and 239 are compressed between the housing and the head 224. The gasket 236 is held vertically by a ring 242 (FIG. 5) also typically of 310 stainless steel bolted to the housing 233. This gasket serves as a trap to prevent particulate from penetrating into housing 233 and also prevents displacement of the filter tube 52 under the pressure of the gas being filtered. The gasket 239, which extends above gasket 236, serves to fill asperities in the outer surface of head 224. This gasket is composed of resilient fibrous material and by its resilience compensates for the differential thermal expansion in the high temperature of the gas between the filter tube and the housing. The mounting means 220 for the filter tube 52 also includes a third gasket 245 in the shape of a washer. This gasket is also composed of fibrous resilient material. This gasket 245 engages the upper surface of the head 224 under compression by a nut 248 (FIG. 3) through a ring 251 (FIG. 4). The nut 248 and ring 251 are composed typically of 310 stainless steel. The nut 248 is screwed into the thread 234 in the housing 233 and is held in the housing by pins 254 which engage slots 257 in the nut. The gasket 245 serves to fill the asperities in the surface of the top of the head 224, minimizes eccentric loading of the filter tube 52 and, by its resilience, compensates for the differential thermal expansion of the housing and filter tube. An annular top 260 (FIG. 6) is welded gas-tight to the upper rim of the housing 233. A tube or pipe 263 is welded gas-tight to the rim of the opening in the top 260 and is coaxial with the top. The top 260 and tube 263 are also typically composed of 310 stainless steel. The filter rubes 52 are suspended from the auxiliary tube sheet (136, 145, 151, FIG. 1 parent application) by the tubes 263 which are welded gas-tight to the boundaries of perforations in the tube sheet.

While a preferred embodiment of this invention is disclosed herein, many modifications thereof are feasible. This invention is not to be restricted except insofar as is necessitated by the spirit of the prior art.

We claim:

1. A filter tube assembly for filtering apparatus for separating particulate from a gas stream, the gas from said gas stream being under high temperature and also under high pressure; said filter tube assembly including: a filter tube having an annular elongated section terminating in a laterally expanded annular head having an outer surface tapering outwardly from said elongated section and terminating in a cylindrical surface; a housing for said head; gasket means in said housing enclosing said head and at least in part interposed between the outer surface of said head and said housing for compressing said gasket means; said gasket means accommodating said filter tube to the conditions existing in said gas; said gasket means being structured and shaped to match the outer surface of said head of said filter tube and the inner surface of said housing being shaped to match the outer surface of said gasket means.

2. The filter-tube assembly of claim 1 wherein the gasket means is structured and shaped to preclude said filter tube from disengaging said housing under the pressure of said gas, to trap particulate preventing its penetration into said housing to accommodate differential expansion between the housing and the filter tube and to fill up asperities in the surfaces of the head of said filter tube.

3. The filter-tube assembly of claim 1 wherein the gasket means includes an annular gasket whose inner surface is cylindrical and whose outer surface is frustro-conical and the housing is provided near one end thereof with an inner frustro-conical surface matching the outer surface of said gasket, said gasket being disposed with its inner cylindrical surface in engagement with the outer surface of the filter tube at the junction of said outer surface and the head of the filter tube and with its outer surface in engagement with the frustro-conical surface of the housing, said gasket being under compression exerted by said housing and serving to trap particulate and suppress the penetration of particulate into said housing and also to suppress displacement of said filter tube under the pressure of the gas.

4. A filter tube assembly for filtering apparatus for separating particulate from a gas stream; the gas from said gas stream being under high pressure; said filter tube assembly including: a filter tube having an annular elongated section terminating in a laterally expanded head; a housing for said head shaped internally to match the outer surface of said head; gasket means in said housing enclosing said head and at least in part interposed between the outer surface of said head and the inner surface of said housing and being compressed between said outer and inner surfaces; said gasket means being structured to accommodate said filter tube to the conditions existing in said gas.

5. The assembly of claim 4 wherein the housing includes means for suspending said filter tube from said head.

* * * * *